Figure 1:
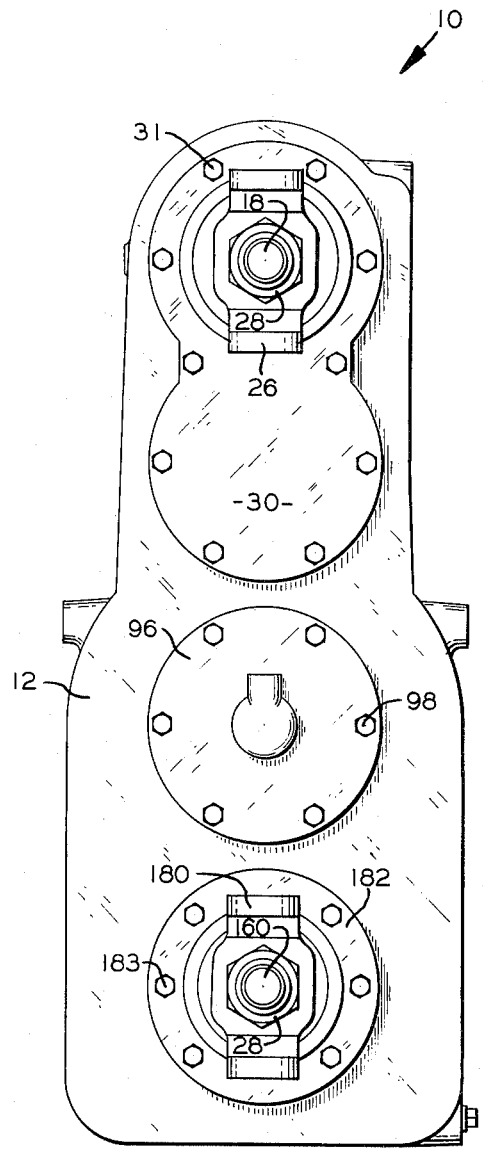

United States Patent Office 3,247,738
Patented Apr. 26, 1966

3,247,738
TRANSMISSION
Myron M. Schall, Toledo, Ohio, assignor to Dana Corporation, Toledo, Ohio, a corporation of Virginia
Filed Mar. 25, 1963, Ser. No. 267,734
6 Claims. (Cl. 74—665)

This invention relates to power transmissions in general and has particular reference to a power transmission of the transfer case type adapted to be mounted on a truck for driving both the front and rear wheels thereof and also including provisions for driving a power-take-off unit.

A principal object of this invention is to provide such a unit which is dependable, of low cost, rugged, and efficient and wherein the drive to the front wheels may be selected by a hot shift shifting arrangement and wherein the drive to both the front and rear axles may be disconnected while the power-take-off attachment is operated.

Other and further objects of this invention will become apparent from the following description and claims and may be understood by reference to the accompanying drawings, which by way of illustration show a preferred embodiment of the invention and what is now considered to be the best mode of applying the principles thereof.

Figure 2:
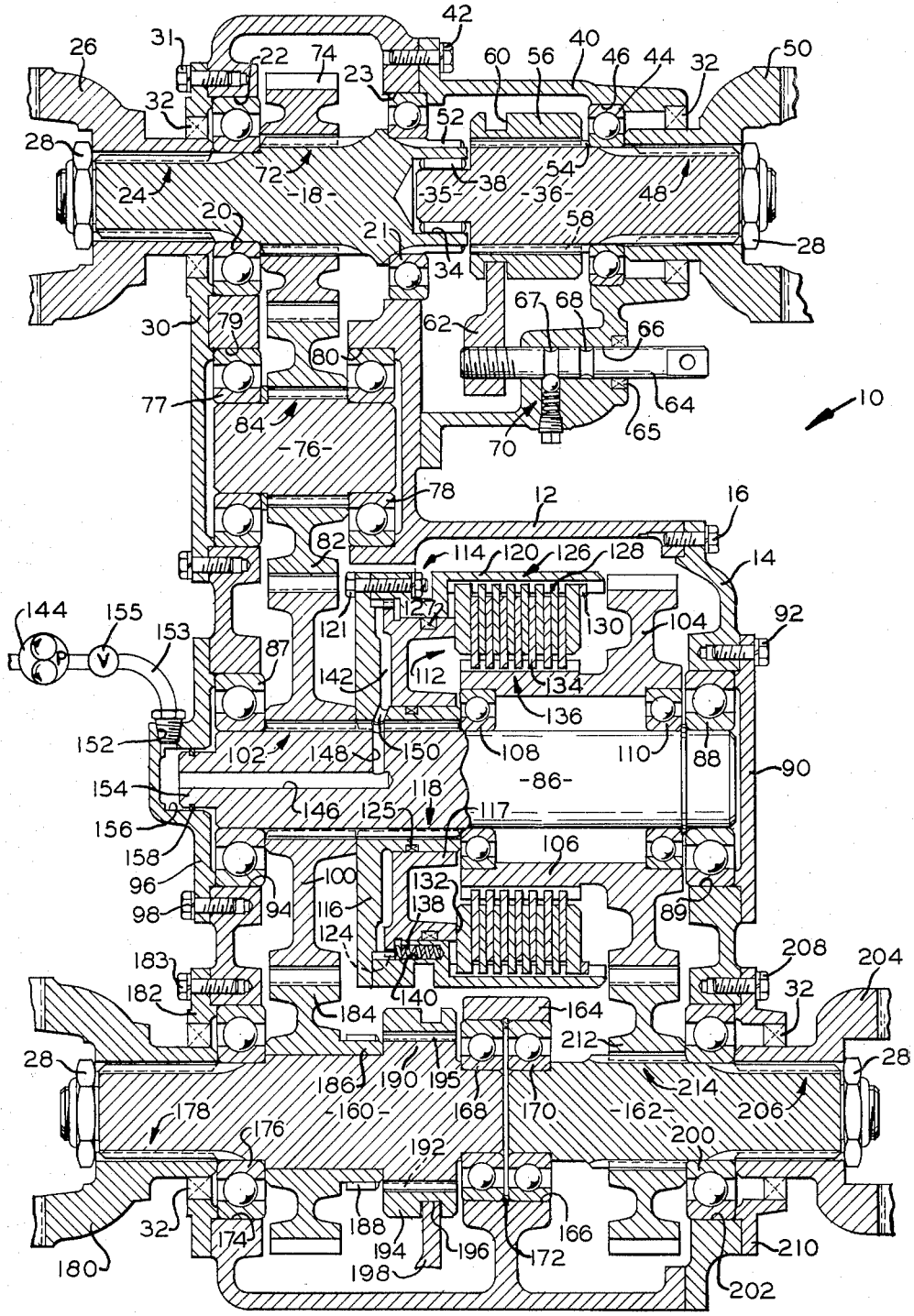

In the drawings:

FIG. 1 is a side elevational view of a transmission embodying this invention; and FIG. 2 is a sectional view of the transmission taken along the lines 2—2 of FIG. 1.

As illustrated in the drawings, the transmission case 10 is of two-piece construction and includes a main portion 12 and an end portion 14; the end portion 14 being secured to the main portion 12 by means of a plurality of bolts, one of which is shown at 16.

An input shaft 18 is rotatably mounted in the case 10 by means of a pair of bearings 20 and 21 pressed into aligned bores 22 and 23 respectively, formed in the main portion 12 of the case 10. As viewed in FIG. 2, the left end of the input shaft 18 extends beyond the case 10. Splined on the extension of the input shaft 18 as indicated at 24 is a coupling member shown fragmentarily at 26, which member is secured to the shaft 18 by means of a lock nut 28. A bearing cap 30 having a central shaft receiving opening is secured to the case 10 covering the bore 22 by means of a plurality of bolts 31 and a sealing means 32 is disposed between the bearing cap and the coupling member 26 in a conventional manner.

The right end of the input shaft 18 extends beyond the case 10 and is provided with a central, axially extending opening 34, which opening pivotally and rotatably receives a reduced portion 35 of the inner end of a power-take-off shaft 36. An annulus of needle bearings 38 is disposed within the opening 34 and surrounding the reduced portion 35 to provide for substantially friction-free relative rotation therebetween. A cover 40 is secured to the main portion 12 of the case 10 by means of a plurality of bolts, one of which is shown at 42, and rotatably mounts the outer end of shaft 36 by means of a bearing 44 carried by the shaft and pressed into a bore 46 in the cover 40. The right end of the shaft 36 extends out of the cover 40. Splined on the extension of the shaft 36 as indicated at 48 is a coupling member shown fragmentarily at 50, which member is secured to the shaft by means of a lock nut 28. A suitable sealing means 32 is disposed between the cover 40 and the coupling member 50 to seal the opening therebetween in a conventional manner.

The periphery of the input shaft 18 adjoining the right end thereof, and the periphery of the power-take-off shaft 36 adjoining the left end thereof are provided with identically sized and shaped splines 52 and 54 respectively. A clutch collar 56, having internal splines 58 adapted to axially slide on and drivingly cooperate with the splines 52 and 54, is carried by the shaft 36. As shown in FIG. 2, the collar 56 is disposed entirely upon the shaft 36 and no driving connection is present between the shafts 18 and 36 so that the shafts are free to rotate relatively. Upon being moved axially to the left so that the splines 58 of the collar 56 drivingly engage both the splines 52 of the shaft 18 and the splines 54 of the shaft 36, the shaft 36 becomes drivingly connected to the shaft 18.

The clutch collar 56 is provided with a peripheral groove 60, which receives a conventional shift fork 62 carried by a shift rod 64. The rod 64 is slidably mounted in a bore 66 formed in the cover 40 and a sealing means 65 is disposed conventionally therebetween. The rod 64 is provided with a pair of axially spaced circumferentially extending detent grooves 67 and 68, which grooves are adapted to cooperate with a spring loaded ball detent 70 carried by the cover 40. With the ball detent 70 disposed in the groove 67 as shown, the clutch collar 56 is maintained solely on the shaft 36, whereas when the collar is shifted to the left and engages both the input shaft 18 and power-take-off 36, the detent 70 will be disposed in the groove 68.

Medially positioned on the input shaft 18 and drivingly splined thereto at 72 is an input drive gear 74 adapted to rotate unitarily with the shaft 18. An idler shaft 76 is positioned in parallel, vertically aligned relationship with the shaft 18 and is rotatably mounted in the case 10 by means of a pair of bearings 77 and 78, which bearings are pressed into aligned bores 79 and 80 respectively formed in the case 10; the bore 80 being a blind opening while the bore 79 is covered by a depending portion of the bearing cap 30. An idler gear 82 is splined for unitary rotation on the shaft 76 as shown at 84, which gear 82 is constantly drivingly meshed with the gear 74.

A countershaft 86 is disposed in parallel, vertically aligned relationship relative to the input shaft 18 and the idler shaft 76 and is rotatably mounted in the case 10 by means of bearings 87 and 88. The bearing 88 is pressed into a bore 89 provided in the end portion 14 of the case 10, which bore is covered by a bearing cap 90 secured to the end portion 14 by means of a plurality of bolts one of which is shown at 92. The bearing 87 is pressed into a bore 94 provided in the main portion 12 of the case 10, which bore is covered by a bearing cap 96 secured to the case 10 by a plurality of bolts 98.

A first countershaft gear 100 is splined to the left end of the countershaft 86, as shown at 102, for unitary rotation therewith and is constantly drivingly meshed with the idler gear 82 so that the countershaft 86 is in a simultaneous rotary relationship with the input shaft 18. A second countershaft gear 104, having an elongated axially extending hub portion 106, is rotatably mounted on the shaft 86. A pair of axially spaced bearings 108 and 110 are disposed between the gear 104 and the shaft 86, with the bearing 108 positioned between the left end of the hub 106 and the shaft and the bearing 110 positioned between the right end of the gear 104 and the shaft.

Clutch means, shown generally at 112, are provided to clutchingly engage the second countershaft gear 104 and the countershaft 86 in a unitary driving relationship. More particularly, a two-piece cylinder 114 is comprised of an end wall portion 116 having an axially elongated base portion 117 securely splined at 118 to the shaft 86 for unitary rotation therewith, and an annular axially extending outer wall portion 120 secured to the end wall portion by a plurality of bolts 121. Disposed within the cylinder 114 for relative axial sliding movement is a piston 122, which piston is splined to the cylinder 114 as shown at 124 for unitary rotation therewith and axial movement relative thereto. The radially inner portion of the piston 122 is axially elongated and slidingly engages the base portion 117 with a sealing means 125 disposed conventionally therebetween. The outer portion of the piston 122 is axially elongated and slidingly engages the outer wall portion 120 with a second sealing means 127 disosed conventionally therebetween.

Splined to the internal wall of the outer wall portion 120 as shown at 126 is a plurality of friction disks 128. The disks are adapted for axial sliding movement relative to the cylinder 114, while being unitarily rotatable therewith. The farthest disk to the right is engaged on its right side by a snap ring 130 carried by the outer wall portion 120 and adapted to limit movement of the disks 15 to the right, while the farthest disk to the left is adapted to be engaged by the right side 132 of the piston 122 which is adapted to function as a pressure plate. Interleaved with the friction disks 128 are a second plurality of friction disks 134, which disks are splined to the hub 106 of the second countershaft gear 104 as shown at 136 for unitary rotation with and axial movement relative to the hub 106 of the gear 104. Accordingly, upon movement of the piston 122 to the right, the interleaved disks 128 and 134 are compressed together thereby clutching the gear 104 to the countershaft 86, while upon movement of the piston 122 to the left, the compressing force upon the disks is relieved and the gear 104 and shaft 86 may rotate relative to each other.

Means are provided to selectively urge the piston 122 to the right and the left. More particularly, a plurality of circumferentially spaced springs, one of which is shown at 138, are each carried in an axially extending opening 140 in the outer wall portion 120 of the cylinder 114. The springs 138 engage the right side of the piston 122 and constantly bias the same to the left. A chamber 142 disposed between the end wall 116 of the cylinder 114 and the piston 122, is adapted to be filled with pressure fluid from a source of fluid pressure 144 thereby urging the piston 122 to the right against the biasing effect of the springs 138 and compressing the interleaved disks 128 and 134. To this end, the countershaft 86 is provided with an axially extending opening 146 which extends inwardly from its left end of the shaft and terminates in a radially extending opening 148 in the shaft which is confluent with an opening 150 formed in the base portion 117 of the end wall 116.

The above described clutch means 112 is of the hot shift or power shift type; that is, it does not require reducing or cutting of the throttle of the prime mover (the reduction in input torque and/or speed) which is driving the input shaft 18 and countershaft 86 before operating the clutch means. This type of clutching operation is possible with the above described clutch means, since there is no necessity to synchronize the speed of rotation of the parts which are to be coupled for unitary rotation before the clutch means is engaged. Accordingly, the clutch means 112 may be engaged to couple or drivingly connect the countershaft 86 and gear 104 at any time even when the input shaft 18 is driving the countershaft at maximum torque and speed.

The bearing cap 96 is provided with an opening 152 into which is suitably secured a fluid pressure line 153 leading to the source of fluid pressure 144. Interposed in the line 153 is a suitable control valve 155 which is preferably positioned within the easy access of the vehicle operator. The left end 154 of the countershaft 86 is piloted in a cooperating bore 156 in the cap 96 with a sealing means 158 conventionally disposed therebetween so that fluid pressure entering the cap 96 from the line 153 is directed into the opening 146 in the shaft 86.

A pair of coaxial output shafts 160 and 162 are disposed in parallel, vertically aligned relationship with the shafts 86, 76 and 18 and are rotatably mounted relative to each other and to the case 10. More particularly, at the medial basal location of the main portion 12 of the case 10 is a boss 164 provided with an axially extending bore 166 into which is pressed a pair of bearings 168 and 170 in an axially aligned relationship. Interposed between and engaging the bearings 168 and 170 is a snap ring 172 suitably carried by the boss 164. The bearings 168 and 170 respectively receive the inner ends of the shafts 160 and 162 and mount the same for rotation relative to each other and to the case 10. Interposed between the shaft 160 and a bore 17 formed in the left side of the case 10 is a bearing 176 disposed in aligned relationship with the bearing 168. The shaft 160 extends beyond the case 10 and has splined thereto, as shown at 178, a coupling member shown fragmentarily at 180, which member is secured to the shaft 160 by a lock nut 28. A bearing cap 182 having a central shaft receiving opening is secured to the case 10 about the bore 174 by means of a plurality of bolts 183 and a suitable sealing means 32 is disposed between the cap 182 and the coupling member 180 in a conventional manner.

Medially positioned on the output shaft 160 is an output gear 184 which is mounted for rotation relative thereto. The gear 184 is constantly drivingly meshed with the countershaft gear 100 so as to be constantly driven by the input shaft 18. Means are provided to drivingly connect the gear 184 and the shaft 160. To this end, the gear 184 has an axially extending hub 186 which is provided on its periphery with clutch teeth 188. The shaft 160 is provided with an integral gear 190 having clutch teeth 192 on its periphery the same size and shape as the clutch teeth 188. Slidably splined in driving relationship on the gear 190 is a clutch collar 194 having internal clutch teeth 195, which collar as shown in the drawing is adapted to be positioned solely on the gear 190 or slid to the left so that the teeth 195 engage the teeth 188 and 192 thereby clutching the gear 184 and the shaft 160 for unitary rotation and drivingly connecting the shaft 160 to the input shaft 18 through the gears 184, 100, 82, and 74. The clutch collar 194 is provided with a peripheral groove 196 which receives a suitable shift fork 198, shown fragmentarily, for shifting the same axially in a conventional manner.

The output shaft 162 extends to the right beyond the end portion 14 of the case 10 while being rotatably mounted therein by means of a bearing 200 carried by the shaft and pressed into a bore 202 formed in the end portion 14. The right end of the shaft 162 has a coupling member, shown fragmentarily at 204, splined thereon as shown at 206, and secured thereto by means of a lock nut 28. A bearing cap 210, having a central shaft receiving opening, covers the bore 202 and is secured to the end portion 14 by means of a plurality of bolts one of which is shown at 208. A suitable sealing means 32 is disposed between the bearing cap 210 and the coupling member 204 to seal the opening therebetween in a conventional manner.

Medially positioned on the output shaft 162 is a second output gear 212, which gear is drivingly splined for unitary rotation to thes haft 162 as shown at 214. The gear 212 is constantly drivingly engaged by the second countershaft gear 104 so that when the gear 10 is clutched to the countershaft 86, the shaft 62 is drivingly connected to the input shaft 18.

The coupling member 204 is normally connected by suitable means to the front wheels of a vehicle (not shown), and since the clutch means 112 is of the hot shift type, the drive to the front wheels may be clutchingly selected at any time, even when the vehicle is in motion or when stationary with drive being transmitted to the power-take-off shaft.

It is readily apparent that the output shafts 160 and 162 can both be neutralized or can be simultaneously or individually drivingly connected to the input shaft 18, and that the power-take-off shaft 36 can be neutralized, driven alone, or driven with the output shafts 160–162 separately or simultaneously.

The present transmission is contemplated for use with a rear mounted engine, the output shaft of which is directed forwardly relative to the vehicle, with the shaft 162 serving to drive the front axle, the shaft 160 driving the rear axle, and the shaft 76 serving to reverse the direction of rotation from the input shaft 18 to the output shafts 160, 162 required by this rear mounting. However, this invention can also be adapted for use with a conventional or forward mounted engine by eliminating the shaft 76 and the gear 82 thereon and meshingly engaging the gear 74 of the shaft 18 with the gear 100 of the shaft 86; it being understood that proper alterations will be made in the case 10 and that the shafts 18 and 36 will be reversed in their position to accommodate such a change.

While a preferred embodiment of this invention has been shown and described, it is readily apparent that many changes can be made therein without departing from the scope of applicant's invention as defined by the following claims.

What is claimed is:
1. A transmission comprising in combination,
 (a) an input shaft,
 (b) a first output shaft rotatably mounted relative to said input shaft,
 (c) first clutch means for selectively drivingly connecting said input shaft and said first output shaft,
 (d) second and third output shafts disposed in parallel relationship relative to said input shaft,
 (e) a countershaft disposed in parallel relationship with said input shaft,
 (f) gear means continuously drivingly connecting said input shaft and said countershaft whereby said countershaft and input shaft are adapted for simultaneous rotation,
 (g) said second output shaft including a gear rotatably mounted thereon and drivingly connected to said gear means,
 (h) second clutch means carried by said second output shaft and operative to selectively clutch said gear to said second output shaft for unitary rotation whereby said second output shaft is driven by said input shaft,
 (i) a countershaft gear rotatively mounted on said countershaft,
 (j) third clutch means of the hot shift type carried by said countershaft and being operative to selectively clutch said countershaft gear to said countershaft for unitary rotation,
 (k) a gear mounted for unitary rotation on said third output shaft and drivingly meshed with said countershaft gear whereby said third output shaft is adapted to be selectively driven by said input shaft,
 (l) and separate independent means for operating each of said clutch means whereby each of said clutch means is adapted to be operated individually and said third clutch means may be operated at any time.

2. A transmission comprising in combination,
 (a) an input shaft,
 (b) a first output shaft rotatably mounted relative to said input shaft,
 (c) first clutch means for selectively drivingly connecting said input shaft and said first output shaft,
 (d) second and third output shafts disposed in parallel relationship with said input shaft,
 (e) a drive gear mounted on said input shaft for unitary rotation therewith,
 (f) a countershaft disposed in parallel relationship with said input shaft,
 (g) gear means continuously drivingly connecting said drive gear and said countershaft whereby said countershaft and input shaft are adapted for simultaneous rotation,
 (h) said second output shaft including a gear rotatably mounted thereon and drivingly connected to said gear means,
 (i) second clutch means carried by said second output shaft and being operative to selectively clutch said gear to the second output shaft for unitary rotation whereby said second output shaft is driven by said input shaft,
 (j) a countershaft gear rotatably mounted on said countershaft,
 (k) third clutch means of the hot shift type carried by said countershaft and operative to selectively clutch said countershaft gear to said countershaft for unitary rotation,
 (l) a gear mounted for unitary rotation on said third output shaft drivingly meshed with said countershaft gear whereby said second output shaft is adapted to be selectively driven by said input shaft,
 (m) and separate independent means for operating each of said clutch means whereby each of said clutch means is adapted to be operated individually and said third clutch means may be operated at any time.

3. A transmission comprising in combination,
 (a) an input shaft,
 (b) a first output shaft coaxial with said input shaft and rotatably mounted relative thereto,
 (c) first clutch means for selectively drivingly connecting said input shaft and said first output shaft,
 (d) second and third coaxial output shafts disposed in parallel relationship with said input shaft,
 (e) a drive gear mounted on said input shaft for rotation therewith,
 (f) a countershaft disposed in parallel relationship with said input shaft,
 (g) gear means continuously drivingly connected to said drive gear and said countershaft whereby said countershaft and input shaft are adapted for simultaneous rotation,
 (h) said second output shaft including a gear rotatably mounted thereon and drivingly connected to said gear means,
 (i) second clutch means carried by said second output shaft and operative to selectively clutch said gear to said output shaft for unitary rotation whereby said second output shaft is driven by said input shaft,
 (j) a countershaft gear rotatably mounted on said countershaft,
 (k) third clutch means of the hot shift type carried by said countershaft and operative to selectively clutch said countershaft gear to said countershaft for unitary rotation,
 (l) a gear mounted for unitary rotation on said third output shaft and drivingly meshed with said countershaft gear whereby said second output shaft is adapted to be selectively driven by said input shaft,
 (m) and separate independent means for operating each of said clutch means whereby each of said clutch means is adapted to be operated individually and said third clutch means may be operated at any time.

4. A transmission comprising in combination,
 (a) an input shaft,
 (b) a first output shaft coaxial with said input shaft and having a portion thereof piloted in said input shaft,
 (c) said first output shaft being rotatably mounted relative to said input shaft,
 (d) first clutch means carried by said first output shaft and operative to selectively drivingly connect said input shaft and said first output shaft for unitary rotation,
 (e) a drive gear mounted on said input shaft for rotation therewith,
 (f) an idler shaft disposed in parallel relationship relative to said input shaft, (g) idler gear means drivingly mounted on said idler shaft and meshingly engaged with said drive gear whereby said idler gear and idler shaft are adapted for simultaneous rotation with said input shaft, (h) second and third coaxial output shafts disposed in parallel relationship with said input shaft and rotatably mounted relative thereto and to each other, (i) a countershaft disposed in parallel relationship with said input shaft and output shafts, (j) first countershaft gear drivingly connected to said countershaft and meshed with said idler gear whereby said countershaft and input shaft are adapted for simultaneous rotation, (k) said second output shaft having a gear rotatably mounted thereon and drivingly meshed with said first countershaft gear whereby said gear rotates simultaneously with said input shaft, (l) second clutch means carried by said second output shaft and adapted to clutchingly engage said gear and said second output shaft for unitary rotation whereby said second output shaft is adapted to be driven by said input shaft, (m) a second countershaft gear rotatably mounted on said countershaft, (n) third clutch means of the hot shift type carried by said countershaft and operative to selectively clutch said second countershaft gear to said countershaft for unitary rotation, (o) a gear mounted for unitary rotation on said third output shaft and drivingly meshed with said second countershaft gear whereby said third output shaft is adapted to be selectively driven by said input shaft, (p) and separate independent means for operating each of said clutch means whereby each of said clutch means is adapted to be operated individually and said third clutch means may be operated at any time.

5. A transmission comprising in combination,
(a) an input shaft,
(b) a first output shaft rotatably mounted relative to said input shaft,
(c) first clutch means for selectively drivingly connecting said input shaft and said first output shaft,
(d) second and third output shafts disposed in parallel relationship relative to said input shaft,
(e) a countershaft disposed in parallel relationship with said input shaft,
(f) gear means drivingly connecting said input shaft and said countershaft whereby said countershaft and input shaft are adapted for simultaneous rotation,
(g) said second output shaft including a gear rotatably mounted thereon and drivingly connected to said gear means,
(h) second clutch means carried by said second output shaft and operative to selectively clutch said gear to said second output shaft for unitary rotation whereby said second output shaft is driven by said input shaft,
(i) second gear means carried by said countershaft and said third output shaft,
(j) said second gear means including a plurality of gears and a third clutch means of the hot shift type operatively connected to a gear of said second gear means and operative to drivingly connect said gear to the shaft carrying the same whereby said third clutch means is operative to selectively drivingly connect said second gear means in a driving relationship to the shafts carrying the same,
(l) and separate independent means for operating each of said clutch means whereby each of said clutch means is adapted to be operated individually and said third clutch means may be operated at any time.

6. A transmission comprising in combination,
(a) an input shaft,
(b) a first shaft rotatably mounted relative to said input shaft,
(c) first clutch means for selectively drivingly connecting said input shaft and said first output shaft,
(d) second and third output shafts disposed in parallel relationship relative to said input shaft,
(e) a countershaft disposed in parallel relationship with said input shaft,
(f) gear means continuously drivingly connecting said input shaft and said countershaft whereby said countershaft and input shaft are adapted for simultaneous reaction,
(g) said second output shaft including a gear rotatably mounted thereon and drivingly connected to said gear means,
(h) second clutch means carried by said second output shaft and operative to selectively clutch said gear to said second output shaft for unitary rotation whereby said second output shaft is driven by said input shaft,
(i) a pair of intermeshed gears with one gear of said pair of gears being carried by said countershaft and the other being carried by said output shaft,
(j) and third clutch means of the hot shift type carried by one of said shafts which are carrying said intermeshed gears and being operative to drivingly connect said one shaft to the intermeshed gear carried thereby,
(k) the other of said shafts which are carrying said intermeshed gears being drivingly connected to the intermeshed gears carried thereby whereby said third clutch means is operative to selectively drivingly connect said countershaft and third output shaft,
(l) and separate independent means for operating each of said clutch means whereby each of said clutch means is adapted to be operated individually and said third clutch means may be operated at any time.

References Cited by the Examiner

UNITED STATES PATENTS

| | | | |
|---|---|---|---|
| 2,601,297 | 6/1952 | Keese | 74—700 X |
| 2,687,656 | 8/1954 | Keese. | |
| 2,711,222 | 6/1955 | Bock | 74—700 X |
| 2,802,554 | 8/1957 | Pringle | 74—359 X |
| 2,869,382 | 1/1959 | Klecker et al. | 74—360 |

DON A. WAITE, *Primary Examiner.*